United States Patent [19]
Glover

[11] Patent Number: 5,394,935
[45] Date of Patent: Mar. 7, 1995

[54] EARTH COUPLED THERMAL BARRIER SYSTEM

[76] Inventor: Mike Glover, Rt. 1, Box 11300, Winnsboro, Tex. 75494

[21] Appl. No.: 122,160

[22] Filed: Sep. 17, 1993

[51] Int. Cl.$^6$ .......................... F25B 29/00; F25D 1/02
[52] U.S. Cl. .................................. 165/45; 165/48.1; 165/49; 62/260; 52/171.3
[58] Field of Search .................. 165/45, 48.1, 49; 62/260; 52/171

[56] References Cited

U.S. PATENT DOCUMENTS

| | | | |
|---|---|---|---|
| 1,944,992 | 1/1934 | Miller | 165/45 |
| 2,087,147 | 12/1934 | Hayes | 62/260 |
| 2,462,557 | 2/1949 | Santee | 165/49 |
| 2,559,868 | 7/1951 | Gay | 165/45 |
| 2,829,504 | 6/1956 | Schlichtig | 62/260 |
| 3,339,629 | 9/1967 | Hervey | 165/45 |
| 3,590,913 | 7/1971 | Tschudin | 165/61 |
| 3,782,132 | 1/1974 | Lohoft | 165/45 |
| 4,323,113 | 4/1982 | Troyer | 165/45 |
| 4,409,798 | 10/1983 | Yuan | 165/45 |
| 4,433,720 | 2/1984 | Lowstuter | 165/45 |
| 4,476,921 | 10/1984 | Stubbolo | 165/45 |
| 4,517,958 | 5/1985 | Worf | 165/48.1 |
| 4,741,389 | 5/1988 | Smith | 165/45 |
| 4,993,483 | 2/1991 | Harris | 165/45 |
| 5,183,100 | 2/1993 | Harrell, Jr. | 165/45 |

FOREIGN PATENT DOCUMENTS

| | | | |
|---|---|---|---|
| 0028840 | 5/1981 | European Pat. Off. | 165/48.1 |
| 2843813 | 4/1980 | Germany | 165/45 |
| 3050144 | 12/1982 | Germany | 165/45 |
| 0087729 | 7/1981 | Japan | 165/45 |
| 0043137 | 3/1982 | Japan | 62/260 |
| 1585528 | 3/1981 | United Kingdom | 165/45 |

*Primary Examiner*—John K. Ford
*Attorney, Agent, or Firm*—Charles D. Gunter, Jr.

[57] ABSTRACT

An earth coupled, thermal barrier system of the invention has thermal panels for ceilings, floors, windows and walls; an air treatment unit to precondition the air and an earth coupled heat exchanger. The air treatment unit contains a preconditioning coil, a humidification unit with a humidifier and/or a dehumidifier, an impeller motor and an impeller. A pump circulates cooling and heating fluid through conduits that interconnect the thermal panels and the preconditioning coil to an earth coupled heat exchanger.

15 Claims, 3 Drawing Sheets

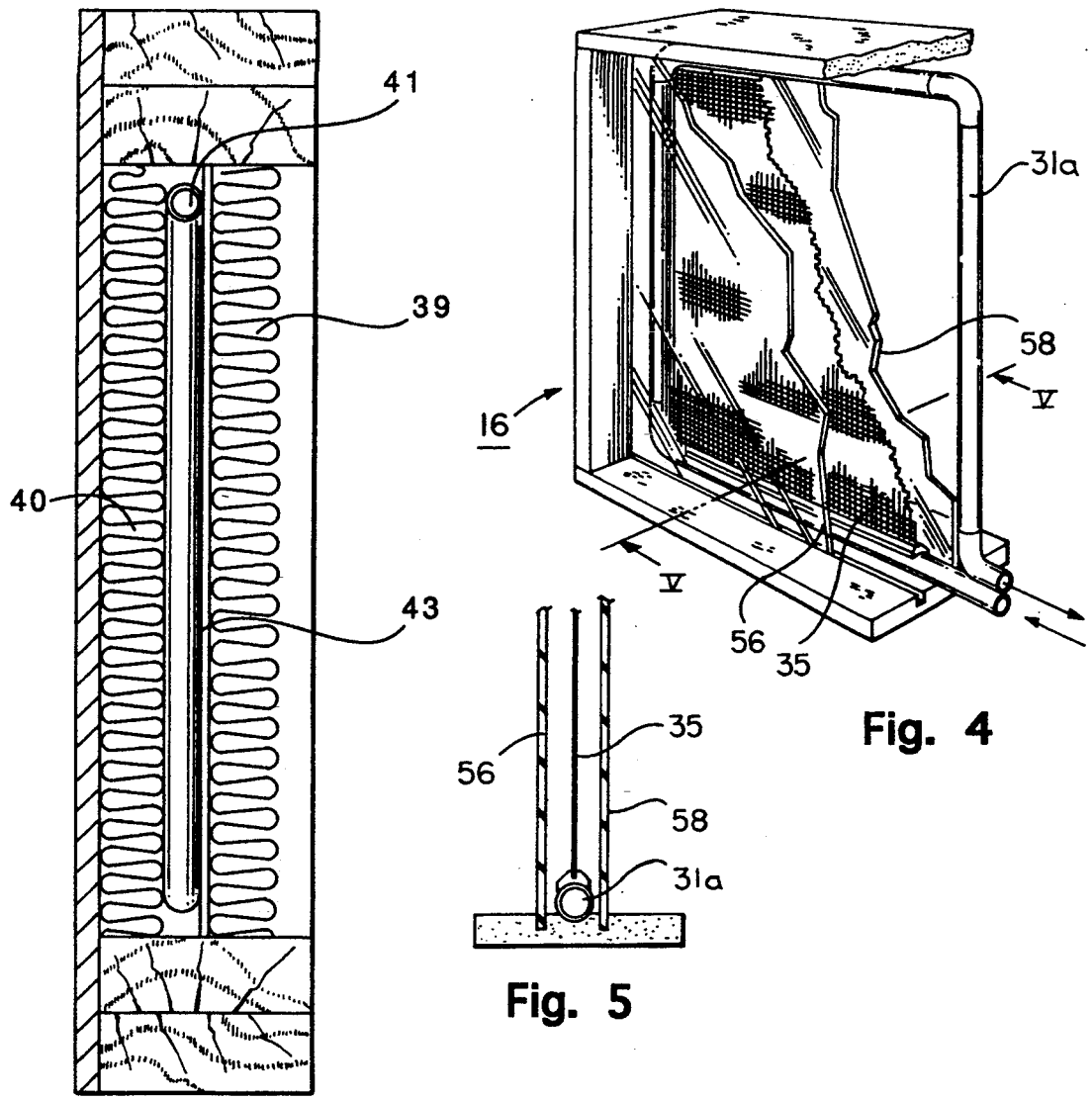
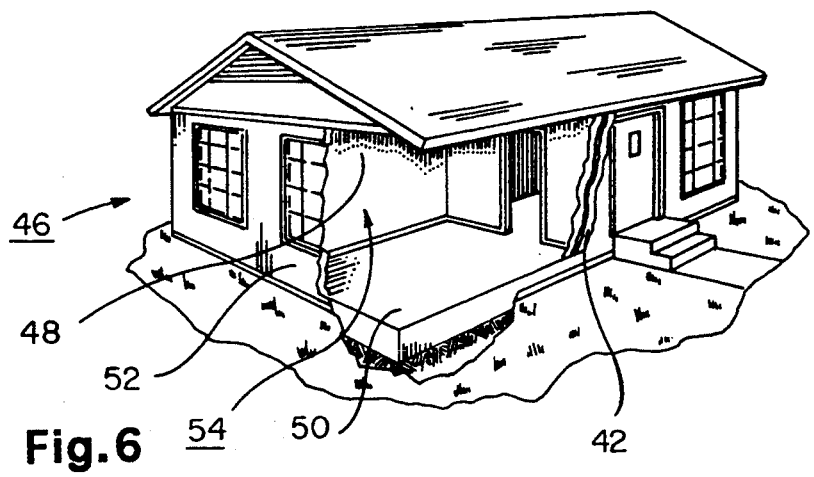

EARTH COUPLED THERMAL BARRIER SYSTEM

BACKGROUND OF THE INVENTION

1. Field of the Invention

The invention relates to an earth coupled, thermal barrier system using thermal cooling and heating panels connected with an earth coupled heat exchanger.

2. Background Information

A continuing need exists to efficiently heat and cool buildings. The typical cooling and heating system consists of an indoor unit that either removes heat or adds heat to the air. The majority of this heat enters or leaves the building through the walls, ceiling, windows and doors. Conventional cooling systems remove heat only after the heat enters the building, while conventional heating systems only add heat after the interior air has cooled from the heat leaving the building.

Although the efficiency of heating and cooling systems has improved, these systems are still costly to use. The cooling systems, for example, take the heat removed from the interior and transfer the heat outside through a mechanical refrigeration system, where the outside temperature is as much as 30° F. higher than the desired inside temperature. In humid climates, the standard air conditioning system must also remove humidity from the air in the building's interior. In addition, maintenance costs are often high and the system life short. Conventional systems have an estimated life of only 10 to 15 years before replacement or large scale repairs.

The principle of using the earth's constant temperature to reduce heating and cooling costs within a building is well known. Underground houses, such as earth houses, take advantage of the earth's constant temperature by building most of the structure underground to reduce the heating and cooling costs. An underground house is therefore surrounded by the mild temperature of the earth year round. Because people prefer not to live underground and many communities have ordinances prohibiting them, underground houses have not been commercially successful on a large scale.

Using geothermal or earth coupled loop heat exchangers as a thermal storage area is also well known. Since the earth temperature remains constant year round, the outlet temperature of a water source for an earth coupled heat exchanger is the earth temperature, generally 67°±1° F. in Dallas, Tex. Extensive use of this concept in practical and economical devices for heating and cooling, however, is a recent development. With the increasing importance of energy conservation, a need exists for efficient earth coupled heat exchangers to save energy and achieve lower operating costs for heating and cooling systems.

Radiant panel systems are also well known. Radiant panel systems typically combine controlled temperature room surfaces with central station air conditioning or heating. The controlled temperature surfaces are typically located in the floor, interior wall or ceiling and maintain temperature by circulating water, air or electric resistance. A controlled temperature surface is referred to as a radiant panel if 50% or more of the heat transfer is by radiation to other surfaces that contact the panel.

Many forms of radiant panel heating and cooling systems currently exist. These systems normally include radiant panels installed in ceilings, floors or walls that contain heat resistant cable or water tubes and are interconnected with heating and cooling heat exchangers. The heat exchangers are alternately operated in heating or cooling modes of operation. Typically, one heat exchanger unit is supplemented with an additional heating apparatus, such as a water side heat pump or a hot water boiler, to add extra heat to the system and structure. The other heat exchanger unit is supplemented with a cooling apparatus, such as a water chiller, to remove heat from the system and structure. Heat is normally dissipated from the cooling system to the atmosphere when in the cooling mode of operation.

Several factors decrease the efficient operation of such radiant panel cooling and heating systems. One factor is the dissipation of unwanted heat to the atmosphere where ambient temperature varies widely. As a result, mechanical refrigeration is required to remove heat at a sufficient rate. Another factor is the removal of additional heat and moisture after entering the interior of the structure. In addition, all cooling systems cool most of the air or water to a temperature low enough to remove moisture in the air, which requires mechanical refrigeration to obtain sufficiently low temperatures.

Current cooling systems also require ozone depleting chlorofluorocarbon (CFC and HCFC) refrigerants which are associated with global warming. Consequently, government regulations concerning these refrigerants have increased, with scheduled limits on their manufacture and use. Therefore, a need exists for cooling systems that reduce the dependence on these refrigerants.

An object of the invention is to produce an efficient cooling and heating system with radiant panels coupled to a geothermal heat exchanger. The system preferably has reduced maintenance costs with a longer system life than a conventional heating and cooling system.

Another object of the invention is to produce an efficient cooling and heating system that does not require a supplemental heating or cooling apparatus associated with the heat exchanger.

Another object of the invention is the removal or addition of heat and moisture before entering the structure.

Another object of the invention is to produce a cooling system that greatly reduces or eliminates the use of CFC or HCFC refrigerants.

SUMMARY OF THE INVENTION

The invention relates to an earth coupled, thermal barrier system for a structure having a ceiling, a floor, an interconnecting wall and an interior airspace. The system comprises a thermal panel located within the wall, ceiling or floor of the structure; an earth coupled heat exchanger; a first conduit to transfers heat between the thermal panel and the heat exchanger; an air treatment unit containing a preconditioning coil, an impeller motor and an impeller connected to the impeller motor, wherein the impeller blows air across the coil; a second conduit to transfer heat between the coil and the heat exchanger and means for transferring heat throughout the earth coupled, thermal barrier system.

The invention also relates to an earth coupled, thermal barrier system for a structure comprising: a thermal panel located within the wall, ceiling or floor of the structure; an earth coupled heat exchanger; a first conduit for connecting the thermal panel to the heat exchanger; an air treatment unit containing a preconditioning coil, a humidification unit including a dehumidifier and/or a dehumidifier, an impeller motor and an impeller for blowing air across the coil to the humidification unit; a second conduit for connecting the coil to the heat exchanger; heat exchange fluid and a pump for circulating the fluid throughout the earth coupled, thermal barrier system. Preferably this system also has a thermal window panel located in either the wall or ceiling and a third conduit for connecting the thermal window panel with the earth coupled heat exchanger.

The earth coupled, thermal barrier system of the invention is an efficient building comfort system, especially for residential and small commercial buildings. The earth coupled, thermal barrier system of the invention gives a standard brick veneer building the advantages of the underground house, without requiring the majority of the structure to be underground.

The earth coupled, thermal barrier system of the invention prevents heat from ever entering the building by absorbing the heat in the walls, ceilings and windows to eliminate the majority of the heat before it enters the building while in the cooling mode. This prevention of heat infiltration reduces cooling costs. In northern climates, the use of the earth coupled, thermal barrier system of the invention not only reduces heat infiltration, but it can eliminate the reliance on expensive air conditioning to cool the building.

In a similar manner to the cooling mode, the system of the invention dissipates heat to the walls, ceilings and windows when in the heating mode. This reduces the amount of energy required to heat a house, thus reducing the amount of fossil fuels consumed for heating.

In addition to energy efficiency, other costs are reduced. The maintenance costs of the earth coupled, thermal barrier system are lower than the conventional heating and cooling system. The life of the earth coupled, thermal barrier system is estimated to be at least 50 years, which is much greater than a convention system.

The earth coupled, thermal barrier system of the invention keeps the interior air below the dew point to prevent condensation and remove any heat gain from interior sources. Waste heat formed during dehumidification could be used to produce hot water, thus making dehumidification a byproduct of water heating or vice versa.

DESCRIPTION OF THE DRAWINGS

FIG. 3 is a cross-sectional view taken generally along lines III—III in FIG. 2, but showing the insulation in place on both sides of the thermal panel within the wall;

FIG. 4 is a partial, perspective view of a thermal window panel containing a thermal screen;

FIG. 5 is a partial, end view of the thermal window panel of FIG. 4; and

FIG. 6 is a perspective view of a house, with portions of the exterior wall broken away, illustrating the thermal barrier system of the invention.

DESCRIPTION OF THE PREFERRED EMBODIMENT

Figure 1:
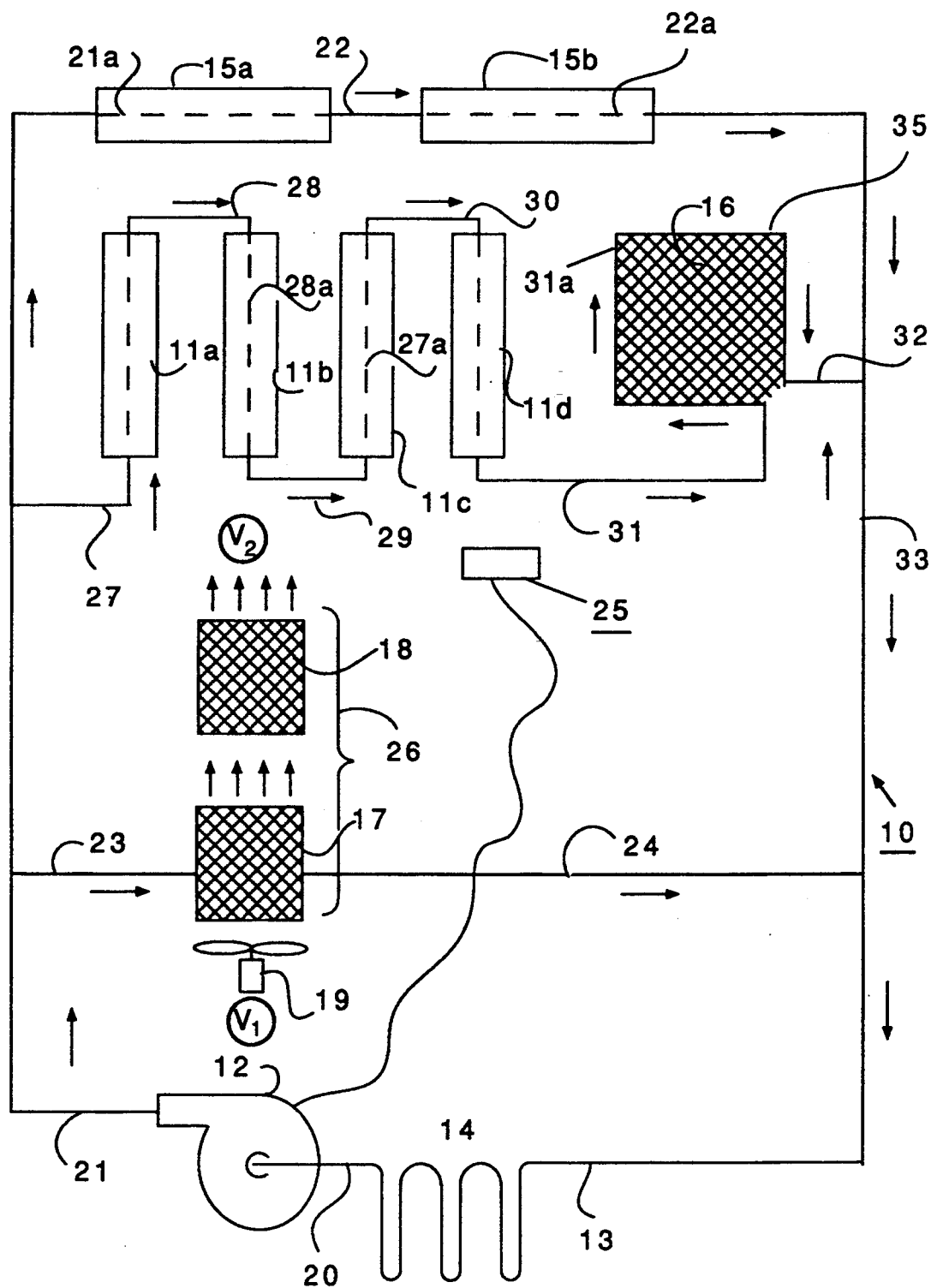
FIG. 1 is a schematic block diagram of one embodiment of an earth coupled, thermal barrier system of the invention.

In accordance with the present invention, an earth coupled, thermal barrier system uses an earth coupled heat exchanger and thermal panels installed in the ceiling, floors, walls and/or windows of the structure to maintain the structure's "envelope" or exterior surfaces at or near earth temperature by absorbing or dissipating heat. The panels can be installed wherever heat loss or gain occurs. Therefore, the panels are usually installed in the outer walls and top floor ceiling(s). Conduits, such as fluid or water tubing, interconnect the thermal panels and the earth coupled heat exchanger.

A pump constitutes a circulatory means for circulating a fluid heat exchange medium throughout the system. For a closed loop system, the pump is sized to overcome the friction loss in the conduit. For example, a suitable pump for the cooling load of a 1950 square foot house is sized for 12 gal/min. at 25 lb/in.$^2$-gal head. A pump of this size would consume approximately 2374 kWh, if it ran for 24 hours a day year round. Typically, the pump would run when the outside temperature was above 72° F. and below 57° F.

Heat is transferred between the earth coupled heat exchanger and the thermal panels. When heating, the thermal barrier dissipates earth heat to the outer walls, ceilings, floors and windows of the structure to maintain a temperature at or near earth temperature. Heat loss from the interior of the structure is minimized by the closer temperature difference between the interior and the wall, ceiling or window. The cooling mode of the thermal barrier system operates in the same manner, except heat gain from the exterior is absorbed by the thermal barrier system before it reaches the interior of the wall. Heat gain from the exterior is eliminated as a result of the wall remaining at ground temperature and below the desired space temperature.

If a conventional structure is subjected to 20° F. weather, for instance, the structure's outer walls are usually colder than the interior temperature. Heat flows from the warm room to the colder outer wall which cools the room. If a thermal barrier system of the invention is used, however, a thermal barrier forms between the outside air and the inside air. Heat is lost from the panel first rather than the inside air, thus reducing heat loss from the room.

Interior heat can be controlled by circulating the fluid through a preconditioning coil. When cooling, interior heat produced by people, lights and appliances is removed from the air by circulating the fluid through a preconditioning coil. When heating, interior heat can be added by circulating fluid at the desired temperature through the preconditioning coil. This coil now becomes a standard hot water heating coil.

If desired, the system can introduce outside air into the structure. The outside air would pressurize the house and replace conditioned air lost through infiltration, bath exhaust, kitchen exhaust, and the like. In areas with high humidity, humidity infiltration within the structure is controlled with both outside air and dehumidification with an air treatment unit that incorporates a dehumidifier. Examples of dehumidifiers include a dehumidifying heat pump such as a geothermal heat pump or a dehumidifier unit such as a refrigerated or desiccant type dehumidifier. The geothermal heat pump can also have a hot water heat recovery system to generate hot water. For increasing the humidity under low humidity conditions, such as during the winter heating season, a humidifier can also be incorporated into the air treatment unit.

The air treatment unit contains an impeller, an impeller motor and a preconditioning coil. The preconditioning coil has at least 5 rows, preferably at least 6 to 8 rows and is earth coupled. A suitable preconditioning coil is available from most water coil manufacturers, such as HEATCRAFT, Ashcraft Co., Fort Worth, Tex. A suitable combined impeller/coil unit is MAGICAIRE, Ashcraft Co. If desired, the air treatment unit can also contain air vents and a humidification unit that may include a dehumidifier, a humidifier and a humidity controller. Air filters may be used with the air vents as well. The air vents may form a separate ventilation system or use the ventilation system of a conventional heating or cooling system within the house. The humidity controller, such as a humidistat, can be installed within the house to monitor the amount of humidity present in the interior air or it can be installed within the air treatment unit to monitor the humidity of the outside air and regulate the amount of moisture vented into the house. The appropriate humidifier or dehumidifier can be manually switched on or off during the appropriate heating or cooling season.

During the operation of the air treatment unit, the impeller motor turns the impeller to draw air into the air treatment unit through an air filter within a first air vent. The air can be inside air, outside air or a mixture of both. The filtered impelled air passes across the preconditioning coil where it is either cooled or warmed. The preconditioned impelled air then passes to the dehumidifier where excess moisture is removed from the air. The cooled, dehumidified air is then vented through a second air vent as part of the conventional building ventilation system, a secondary ventilation system or vents into the building's living or working space directly. If dehumidification is not desired, the air treatment system may operate without the dehumidifier. If humidification is desired, then the air treatment system operates in the manner described above with a dehumidifier, except the humidifier adds moisture to the dry, warm air before venting into the building. If both a humidifier and a dehumidifier are used, they can be installed in tandem.

Referring now to FIG. 1, a schematic block diagram illustrates an earth coupled, thermal barrier system of the invention, generally identified by the numeral 10. Although the particular design of the earth coupled, thermal barrier system varies from building to building, the design should allow both minimum friction loss and pump energy consumption. The arrows designate the direction of flow. The earth coupled thermal barrier system 10 includes a pump 12 for circulating fluids throughout the system; thermal wall panels 11a, 11b, 11c, 11d; thermal ceiling panels 15a, 15b; thermal window screen 16; an impeller, such as fan or blower 19; a preconditioning coil 17; a dehumidification unit 18 and a heat exchanger 14 coupled to the earth.

The heat exchanger 14 functions to either dissipate or supply heat to the system, depending upon ambient temperature conditions. The heat exchanger 14 receives heat and transfers it to the earth in the cooling mode of operation. In the alternative, the heat exchanger 14 transfers heat from the earth in the heating mode of operation. The dissipation of heat through heat exchanger 14 to the earth is an important aspect of the present invention. The heat exchanger 14 may be any of those geothermal heat exchangers known in the art, for example, a vertical closed loop piping system, horizontal closed loop piping system, an open loop water well, a municipal or private water main, and the like. A closed loop piping system is preferred.

The thermal panels act as a thermal barrier to eliminate unwanted heat transfer through walls, ceilings and windows. Thermal panels 11a, 11b, 11c, 11d, 15a, 15b for heating and cooling are installed in ceilings and walls of the structure. The thermal panels are preferably radiant panels. The typical panel is about 4 feet by about 8 feet. A fluid heat transfer medium flows through heat transfer tubing (e.g., 21a, 22a, 28a and 29a in FIG. 1) within the panels. The fluid, heat transfer medium can be, for example, ordinary tap or well water. If water is used as the transfer medium, a freezing point depressant, such as ethylene glycol can be added for winter operation of a closed loop system. Other conventional additives such as rust or scale inhibitors, bactericides, and the like, may also be present.

The heat transfer tubing is made of a heat conducting material, such as copper, aluminum and the like. Preferably, the panels also contain a heat conducting sheet, such as aluminum, contacting or thermally bonded to the heat transfer tubing. The heat transfer tubing and heat conducting sheet can be sheathed with insulation to function as a thermal barrier between the outside air and the inside air. The insulation can be any type of insulation used in the building trades, such as foil faced foam board, fiberglass, cellulose, and the like. The heat transfer tubing 21a, 22a, 28a, 29a absorbs heat from the inside air in the cooling mode and transfers it to the fluid medium within the tubing, while it dissipates heat in the heating mode.

FIG. 6 shows a conventional residential dwelling structure 46 having a ceiling 48, a floor 50 and a series of interconnecting walls 52 which define an interior 54 of the structure having an exposed surface area. The thermal panels of the invention are located within at least a selected one of the wall, ceiling and floor of the structure. Preferably, the thermal panels are located within at least the ceiling and exterior walls of the structure. Each of the thermal panels has a planar, heat transferring surface with heat transfer tubing in contact therewith.

Figure 2:
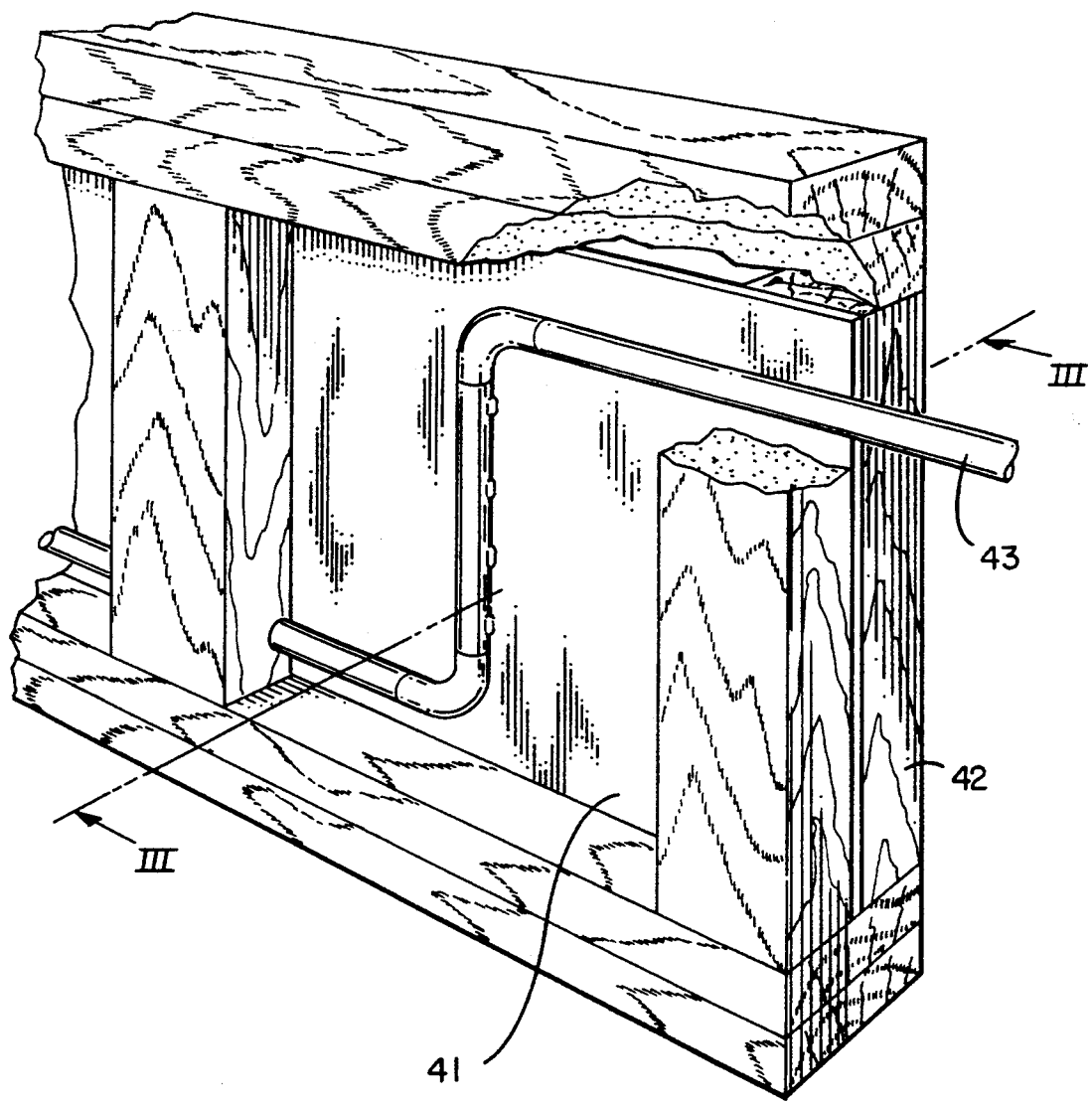
FIG. 2 is a partial, perspective view of a wall containing a thermal panel with the insulation on one side of the thermal panel removed for ease of illustration.

FIGS. 2 and 3 are sectional views of a wall 42 with one version of the thermal panels of the invention installed therein. A ½ inch copper pipe 43 serves as heat transfer tubing and is bonded to an aluminum sheet 41 of approximately 48 inches by 96 inches. In the embodiment of FIGS. 2 and 3, the aluminum sheet 41 is located centrally within the wall. The aluminum sheet 41 can also be located on the interior or exterior side of the wall 42, depending on the predominate ambient temperature and relative humidity for the geographic area the structure is located. For a structure located in a hot climate, the sheet is preferably located on the exterior side of the wall 42. In the cooling mode, the aluminum sheet 41 absorbs the heat and conducts the heat to the copper pipe 43, which in turn heats the circulating fluid inside of the pipe. Both sides of the copper pipe 43 and aluminum sheet 41 are preferably surrounded with insulation (39, 40 in FIG. 3).

A thermal window panel 16 (FIGS. 4 and 5) is preferably installed in the window openings of the structure for heating and cooling. In the embodiment of FIG. 4, the thermal window panel 16 comprises an aluminum screen 35 located between an interior and an exterior glass pane 56, 58. The aluminum screen 35 has screen tubing 31a affixed about the periphery of the screen 35. Fluid heat exchange medium flows through screen tubing 31a that contacts the thermal screen 16. The fluid in the tubing 31a absorbs or dissipates heat to the exterior and interior window glass. The screen 35 and glass act as a thermal barrier between the outside and inside.

The number of thermal panels installed within the structure varies due to the location, design and type of structure. Nevertheless, the combined surface area of the heat transfer surfaces of the thermal panels in the outer walls and ceilings should be at least two thirds the total surface area of the outer walls and ceiling of the structure and preferably should exceed about 90% of the total surface area.

The thermal panels can also comprise conventional aluminum foil faced insulation barrier material of the type available commercially in rolls to which the copper tubing is bonded or made to contact. In such case, the roll insulation barrier material would essentially envelope the outer walls and ceiling of the structure.

In operation, the pump 12 (FIG. 1) circulates the fluid heat exchange medium throughout the system. Fluid flows from the heat exchanger 14 through tubing 20 to the pump 12 which pumps the fluid through main tubing line 21. The fluid in line 21 can flow through line 27 and each of the lines 28, 29 and 30 to the thermal panels 11a, 11b, 11c, and 11d in series fashion. In the alternative, the fluid in line 21 can flow through line 22 to the thermal panels 15a and 15b in a series fashion. Fluid in line 31 can also flow through the thermal window panel 16 if window panels are present in the system. Fluid returns to the heat exchanger by return tubing 32, 33. The pump 12 is controlled by any means known in the art, preferably by a relay and control thermostat 25 located inside the structure's air space.

Alternatively, the fluid is diverted from the main tubing line 21 to air treatment tubing 23 and to the preconditioning coil 17 of the air treatment unit, generally designated as 26. The air treatment unit 26 asserts a positive pressure on the interior and adds outside air with about 0.25 air changes per hour. The fan or blower 19 forces air from a first vent "V$_1$" across the preconditioning coil 17 to the dehumidifier 18. The preconditioning coil 17 preheats or precools the air by the absorption or dissipation of heat by the fluid circulating within a 6 row coil 17. Then the preconditioned air is dehumidified by the dehumidifier 18, if needed, before venting the air into the structure's interior through a second vent "V$_2$." Fluid flows from the preconditioning coil 17 and back to return tubing 33 and the earth coupled heat exchanger 14 through postcoil tubing 24.

If a long term shutdown is desired during cold weather, the fluid in a closed loop system can contain sufficient freeze inhibiting chemicals, such as ethylene glycol, diethylene glycol, and the like, to protect the system from freezing. Alternatively, the fluid can be drained from the system.

A closed loop system can have at least one inlet and one outlet to adjust the amount of fluid circulating within the system. This outlet can be used to drain the system for repair or long term cold weather shutdown.

Whereas the invention has been described with respect to specific embodiments thereof, it will be understood that various changes and modifications will be suggested to one skilled in the art and it is intended to encompass such changes and modifications within the scope of the appended claims.

I claim:

1. An earth coupled, thermal barrier system for a structure having a ceiling, a floor and an interconnecting wall, comprising:

a thermal panel located within at least a selected one of the wall, ceiling and floor of the structure, the thermal panel comprising heat transfer tubing and a heat conducting sheet in contact with the heat transfer tubing;

an earth coupled heat exchanger;

a first conduit to transfer heat between the thermal panel and the heat exchanger;

an air treatment unit containing a preconditioning coil, an impeller motor and an impeller connected to the impeller motor, wherein the impeller blows air across the coil;

a second conduit to transfer heat between the coil and the heat exchanger;

a fluid for transferring heat and a pump for circulating the fluid throughout the thermal panel, the heat exchanger, the coil and the conduits;

a thermal window panel within a window opening located within at least a selected one of the wall and ceiling of the structure;

a third conduit connecting the thermal window panel and the earth coupled heat exchanger; and wherein the thermal window panel comprises a thermal screen, screen tubing contacting the screen, and glass encasing the screen and screen tubing.

2. The earth coupled, thermal barrier system of claim 1, wherein the air treatment unit further contains a humidification unit to receive preconditioned air from the coil.

3. The earth coupled, thermal barrier system of claim 2, wherein the air treatment unit further contains first vent means for receiving air and second vent means for exhausting preconditioned air into the structure.

4. The earth coupled, thermal barrier system of claim 3, wherein the humidification unit includes a dehumidifier.

5. The earth coupled, thermal barrier system of claim 3, wherein the humidification unit includes a humidifier.

6. An earth coupled, thermal barrier system for controlling temperature within a structure having a ceiling, a floor and outer walls which define an interior of the structure having an exposed surface area, the system comprising:

a plurality of thermal panels located within the outer walls and ceiling of the structure, each of the thermal panels having a planar, heat transferring surface and having heat transfer tubing in contact therewith:

an earth coupled heat exchanger;

an interconnecting conduit connecting the heat transfer tubing of the thermal panels in the walls and ceiling of the structure with the earth coupled heat exchanger, the conduit having contained therein a fluid heat exchange medium;

circulatory means for circulating the fluid heat exchange medium through the heat exchange tubing in the thermal panels, through the interconnecting conduit and through the earth coupled heat exchanger;

wherein the combined surface area of the heat transfer surfaces of the thermal panels in the outer walls and ceilings is at least 90% of the total exposed surface area of the walls and ceiling of the structure interior;

wherein the fluid heat exchange medium is an aqueous based fluid which is circulated throughout the system by a fluid pump; and further comprising at least one thermal window panel within a window opening located in the wall of the structure, the thermal window panel comprising a thermal screen, heat transfer tubing in contact with the screen, and inner and outer transparent panels encasing the screen and tubing, the tubing being interconnected by the fluid conduit within the earth coupled, thermal barrier system.

7. The earth coupled, thermal barrier system of claim 6, further comprising:
an air treatment unit containing a preconditioning coil, and an impeller for blowing air across the preconditioning coil, the air treatment unit having an air inlet vent and an air outlet vent for exhausting preconditioned and dehumidified air into the interior of the structure.

8. A method of reducing heat loss or gain from a structure having a floor, a ceiling and interconnecting walls, the method comprising the steps of:
a) circulating fluid from an earth coupled, heat exchanger through a first conduit to a thermal panel located within a portion of the structure, the portion being a selected one of the floor, ceiling and walls, the thermal panel having heat transfer tubing in contact therewith;
b) circulating the fluid within heat transfer tubing of the thermal panel;
c) exchanging heat between the fluid within the heat transfer tubing of the thermal panel and the portion of the structure;
d) returning the fluid from the heat transfer tubing of the thermal panel through a return conduit to the earth coupled, heat exchanger;
e) diverting a portion of the circulating fluid from the first conduit through an air treatment conduit to a preconditioning coil, wherein the portion of circulating fluid is diverted prior to the fluid reaching the thermal panel;
f) circulating the diverted fluid through the preconditioning coil;
g) impelling air from a first air vent to the preconditioning coil;
h) preconditioning the air by exchanging heat between the impelled air and the fluid circulating through the preconditioning coil;
i) exhausting the preconditioned air through a second air vent;
j) returning the fluid from the preconditioning coil to the return conduit;
k) returning fluid to the earth coupled, heat exchanger through the return conduit;
l) circulating fluid through the earth coupled, heat exchanger; and
m) exchanging heat between the fluid in the earth coupled, heat exchanger and the earth;
wherein the thermal panel is provided with a heat conducting sheet in contact with the heat transfer tubing and the heat conducting sheet exchanges heat between the portion of the structure and the heat transfer tubing;
wherein fluid is circulated through a thermal window panel within a window opening located within at least a selected one of the wall and ceiling of the structure; and
wherein the thermal window panel is provided with a thermal screen, screen tubing contacting the screen, and glass encasing the screen and screen tubing, and wherein the fluid circulating through the thermal window panel flows through the screen tubing.

9. The method of reducing heat loss or gain from a structure of claim 8 further comprising the step of:
n) dehumidifying the preconditioned air after exchanging the heat with the coil.

10. The method of reducing heat loss or gain from a structure of claim 8 further comprising the step of:
n) humidifying the preconditioned air after exchanging the heat with the coil.

11. The earth coupled, thermal barrier system of claim 8, wherein the fluid is an aqueous based fluid which is circulated throughout the system by a fluid pump.

12. The earth coupled, thermal barrier system of claim 11, wherein the earth coupled heat exchanger is a series of interconnected tubes located underground.

13. The earth coupled, thermal barrier system of claim 12, wherein the interconnected tubes are located in trenches which extend horizontally in the ground below the surface of the earth.

14. The earth coupled, thermal barrier system of claim 12, wherein the interconnected tubes are located in one or more wells which extend vertically in the ground below the surface of the earth.

15. An earth coupled, thermal barrier system for a structure having a ceiling, a floor and an interconnecting wall, comprising:
a thermal panel located within at least a selected one of the wall, ceiling and floor of the structure, the thermal panel comprising heat transfer tubing and a heat conducting sheet in contact with the heat transfer tubing;
an earth coupled heat exchanger;
a first conduit to transfer heat between the thermal panel and the heat exchanger;
an air treatment unit containing a preconditioning coil;
a second conduit to transfer heat between the coil and the heat exchanger;
a fluid for transferring heat and a pump for circulating the fluid throughout the thermal panel, the heat exchanger, the coil and the conduits;
a thermal window panel within a window opening located within at least a selected one of the wall and ceiling of the structure;
a third conduit connecting the thermal window panel and the earth coupled heat exchanger; and
wherein the thermal window panel comprises a substantially transparent thermally conductive solid extending over the entirety of the thermal window panel, tubing in thermal heat conductive relationship with the thermally conductive solid, and inner and outer transparent panels encasing the thermal conductive solid and the tubing.

* * * * *